United States Patent
Cao et al.

(10) Patent No.: US 11,038,641 B2
(45) Date of Patent: Jun. 15, 2021

(54) PILOT-DATA OVERLAP DESIGN FOR UPLINK TRANSMISSION

(71) Applicants: Yu Cao, Kanata (CA); Javad Abdoli, Kanata (CA); Jianglei Ma, Ottawa (CA)

(72) Inventors: Yu Cao, Kanata (CA); Javad Abdoli, Kanata (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 100 days.

(21) Appl. No.: 15/374,065

(22) Filed: Dec. 9, 2016

(65) Prior Publication Data

US 2018/0167182 A1 Jun. 14, 2018

(51) Int. Cl.
*H04L 5/00* (2006.01)
*H04W 74/00* (2009.01)
*H04W 74/08* (2009.01)
*H04W 72/08* (2009.01)

(52) U.S. Cl.
CPC .......... *H04L 5/0048* (2013.01); *H04L 5/0007* (2013.01); *H04L 5/0037* (2013.01); *H04L 5/0091* (2013.01); *H04W 72/082* (2013.01); *H04W 74/004* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 2013/0028219 A1* | 1/2013 | Lee | .................. | H04L 5/0053 370/329 |
| 2013/0114756 A1* | 5/2013 | Jia | .................. | H04J 11/00 375/295 |
| 2014/0293900 A1* | 10/2014 | Takeda | .................. | H04L 5/0073 370/329 |
| 2014/0376482 A1* | 12/2014 | Kim | .................. | H04B 7/024 370/329 |

(Continued)

FOREIGN PATENT DOCUMENTS

| | | |
|---|---|---|
| CN | 101009527 A | 8/2007 |
| CN | 105979597 A | 9/2016 |

(Continued)

OTHER PUBLICATIONS

3GPP TR 25.903 V12.0.0 (Sep. 2014), 3rd Generation Partnership Project; Technical Specification Group Radio Access Network; Continuous connectivity for packet data users (Release 12), 138 pages.

(Continued)

*Primary Examiner* — Jutai Kao

(57) ABSTRACT

Systems and methods are provided in which uplink transmission of pilot uses time-frequency resources that overlap with time-resources for the uplink transmission of data, by the same UE or different UEs. This can result in a decrease in pilot overhead, or if longer pilot sequences are used, can result in a decrease in collision probability. In a group-based approach, UEs are organized into groups, and each group is allocated the same resources for pilot and data.

26 Claims, 14 Drawing Sheets

(56) References Cited

U.S. PATENT DOCUMENTS

| | | | |
|---|---|---|---|
| 2015/0124691 A1* | 5/2015 | Li | H04L 5/005 |
| | | | 370/312 |
| 2015/0223184 A1* | 8/2015 | Bergstrom | H04W 56/0045 |
| | | | 370/329 |
| 2016/0036542 A1* | 2/2016 | Gong | H04W 24/10 |
| | | | 370/329 |
| 2016/0112994 A1* | 4/2016 | Wang | H04L 5/0048 |
| | | | 370/329 |
| 2017/0244526 A1* | 8/2017 | Kim | H04L 5/0048 |
| 2017/0272141 A1* | 9/2017 | Horiuchi | H04L 5/0051 |
| 2018/0035406 A1* | 2/2018 | Hao | H04L 5/0046 |
| 2018/0049230 A1* | 2/2018 | Moradi | H04W 72/1226 |
| 2020/0053789 A1* | 2/2020 | Lee | H04W 74/004 |

FOREIGN PATENT DOCUMENTS

| | | |
|---|---|---|
| CN | 106059733 A | 10/2016 |
| EP | 2775639 A1 | 9/2014 |
| EP | 3284197 B1 | 2/2019 |
| EP | 2929744 B1 | 4/2019 |
| WO | 2015065087 A1 | 5/2015 |
| WO | 2016107430 A1 | 7/2016 |
| WO | 2016180450 A1 | 11/2016 |

OTHER PUBLICATIONS

3GPP TS 36.211, v12.5.0, "Evolved Universal Terrestrial Radio Access (E-UTRA); Physical channels and modulation", Mar. 26, 2015.

* cited by examiner

PILOT-DATA OVERLAP DESIGN FOR UPLINK TRANSMISSION

FIELD

The application relates to pilot and data transmission as part of and uplink transmission.

BACKGROUND

For grant-based transmission in the uplink for Long Term Evolution (LTE), (see for example 3GPP TS 36.211), pilots are transmitted on two symbols for each transmit time interval (TTI) and on every sub-carrier of an assigned bandwidth. All user equipments (UEs) use the same pilot locations. The LTE approach is depicted in FIG. 11 which shows a sub-frame containing 14 orthogonal frequency division multiplexing (OFDM) symbols, including three symbols 1000 for data, a symbol 1002 for pilot, six symbols 1004 for data, a symbol 1006 for pilot, and 3 symbols 1008 for data.

For uplink grant-free contention-based access, multiple user equipments (UEs) may transmit simultaneously using the same time-frequency resource.

If an approach similar to the LTE approach is applied to uplink grant-free contention-based access, when a number of UEs are transmitting simultaneously using the same time-frequency resource and using pilots selected from a pool of available pilots, the chance of pilot collision varies inversely to the number of pilots in the pool of available pilots.

It would be advantageous to have a pilot design with reduced probability of collision or a reduction in pilot overhead.

SUMMARY

Generally, embodiments of the present disclosure provide a method and system for pilot and data overlap for uplink transmission. The use of an overlap between pilot and data may allow a reduction in pilot overhead compared to a system in which there is no such overlap. The use of an overlap between pilot and data may allow longer pilot sequences, which in turn may allow a larger number of pilot sequences, so as to reduce the chance of pilot collision in uplink transmissions compared to a system with a smaller number of pilots.

According to one aspect of the present invention, there is provided a method comprising: for uplink transmission by a user equipment, the user equipment transmitting a pilot sequence using a first time-frequency resource that at least partially overlaps with a second time-frequency resource allocated for data transmission.

In some embodiments, the uplink transmission is a grant-free transmission.

In some embodiments, the method further comprises the user equipment receiving signaling indicating locations of the first time-frequency resource for pilot sequence transmission and a further time-frequency resource for data transmission by the user equipment.

In some embodiments, the signaling indicates at least one of relative and absolute locations in a time-frequency resource pattern for uplink transmission.

In some embodiments, the signaling indicates a selected pattern from a set of predefined patterns of locations of time-frequency resources for pilot sequence transmission and for data transmission.

In some embodiments, the second time-frequency resource is allocated for data transmission of the user equipment.

In some embodiments, the second time-frequency resource is allocated for data transmission of a different user equipment.

In some embodiments, the first time-frequency resource is available for use by a group of user equipments (UEs) for pilot sequence transmission.

In some embodiments, the user equipment is included in a group of UEs having a group identifier, the method further comprising: determining from the group identifier locations of the first time-frequency resource for pilot sequence transmission and a further time-frequency resource for data transmission by the user equipment.

In some embodiments the user equipment is included in the group of UEs based on one or a combination of location, service, UE capability geometry, interference and pilot length.

In some embodiments, the method further comprises the user equipment transmitting data using a third time-frequency resource with a power that is less than that used to transmit the pilot sequence using the first time-frequency resource.

In some embodiments, the method further comprises transmitting an all zero-sequence in a third time-frequency resource that overlaps with a time-frequency resource allocated for pilot sequence transmission of another user equipment.

In some embodiments, the method further comprises receiving signaling indicating locations of the first time-frequency resource for pilot sequence transmission and a further time-frequency resource for data transmission by the user equipment that excludes the third time-frequency resource.

In some embodiments, the first time-frequency resource is available for use by a group of UEs for pilot sequence transmission, and the third time-frequency resource is available for use by a different group of UEs for pilot sequence transmission.

In some embodiments, the method further comprises receiving signaling indicating a group identifier, the method further comprising determining from the group identifier locations of the first time-frequency resource for pilot sequence transmission and a further time-frequency resource for data transmission that excludes the third time-frequency resource.

In some embodiments, the method further comprises the user equipment selecting a pilot and data location pattern from among a set of predefined pilot and data location patterns.

According to another aspect of the present invention, there is provided a method comprising: a network element receiving from a user equipment a first uplink transmission comprising a pilot sequence using a first time-frequency resource that at least partially overlaps with a second time-frequency resource allocated for data transmission.

In some embodiments, the method further comprises transmitting signaling indicating locations of the first time-frequency resource for pilot sequence transmission and a further time-frequency resource for data transmission.

In some embodiments, the signaling indicates at least one of relative and absolute locations in a time-frequency resource pattern for uplink transmission.

In some embodiments, the method further comprises transmitting signaling indicating the second time-frequency resource for data transmission by the user equipment.

In some embodiments, the method further comprises transmitting signaling indicating the second time-frequency resource for data transmission by a different user equipment.

In some embodiments, the method further comprises transmitting signaling that allocates the first and second time-frequency resources.

In some embodiments, the first time-frequency resource is available for use by a group of user equipments (UEs) for pilot sequence transmission.

In some embodiments, the method further comprises transmitting signaling that indicates a group identifier for each UE of the group of UEs, the group identifier being associated with a time-frequency resource pattern to use for pilot sequence transmission and data transmission.

In some embodiments, the method further comprises grouping UEs into groups based on one or a combination of location, service, UE capability, geometry, interference and pilot length, wherein each group of UEs has a common group identifier.

In some embodiments, the method further comprises the network element receiving the first uplink transmission comprises receiving the pilot sequence using the first time-frequency resource and receiving data using a fourth time-frequency resource; the method further comprising: the network element receiving a second uplink transmission comprising receiving a pilot sequence using the second time-frequency resource and receiving data using a third time-frequency resource; wherein the third time-frequency resource does not overlap with any of the first, second and fourth time-frequency resources such that the pilot sequence in the second uplink transmission is free from interference from pilot or data of the first uplink transmission; the fourth time-frequency resource does not overlap with the first time-frequency resource.

In some embodiments, the method further comprises transmitting signaling that indicates locations of the first and fourth time-frequency resources, and indicates locations of the second and third time-frequency resources.

In some embodiments, the first and fourth time-frequency resources are available for use by a group of UEs for pilot sequence transmission and data transmission respectively, and the second and fourth time-frequency resources are available for use by a different group of UEs for pilot sequence transmission and data transmission respectively.

In some embodiments, the method further comprises transmitting signaling indicating a group identifier for each UE, the group identifier being associated with time-frequency resource pattern for pilot sequence transmission and for data transmission.

According to still another aspect of the present invention, there is provided a user equipment comprising: a receive chain for receiving at least one of: a) a grant for grant-based transmission and b) a resource allocation for grant-free transmission; a transmit chain configured to transmit, based on the at least one of a grant and a resource allocation, a pilot sequence using a first time-frequency resource that at least partially overlaps with a second time-frequency resource allocated for data transmission.

In some embodiments, the at least one of a grant and a resource allocation indicates locations of the first time-frequency resource for pilot sequence transmission and a further time-frequency resource for data transmission by the user equipment.

In some embodiments, the transmit chain is configured to transmit an all zero-sequence in a third time-frequency resource that overlaps with a time-frequency resource allocated or scheduled for pilot sequence transmission by another user equipment.

According to a further aspect of the present invention, there is provided a network element comprising a receive chain and a transmit chain, the receive chain configured to receive from a user equipment a first uplink transmission comprising a pilot sequence using a first time-frequency resource that at least partially overlaps with a second time-frequency resource allocated for data transmission.

In some embodiments, the network element further comprises an uplink scheduler/resource allocator configured to transmit signaling indicating locations of the first time-frequency resource for pilot sequence transmission and a further time-frequency resource for data transmission by the user equipment.

In some embodiments the uplink scheduler/resource allocator is further configured to transmit signaling allocating the second time-frequency resource for data transmission by a different user equipment.

In some embodiments the signaling indicates at least one of relative and absolute locations in a time-frequency resource pattern for uplink transmission.

BRIEF DESCRIPTION OF THE DRAWINGS

Embodiments of the disclosure will now be described with reference to the attached drawings in which.

DETAILED DESCRIPTION

Figure 1:
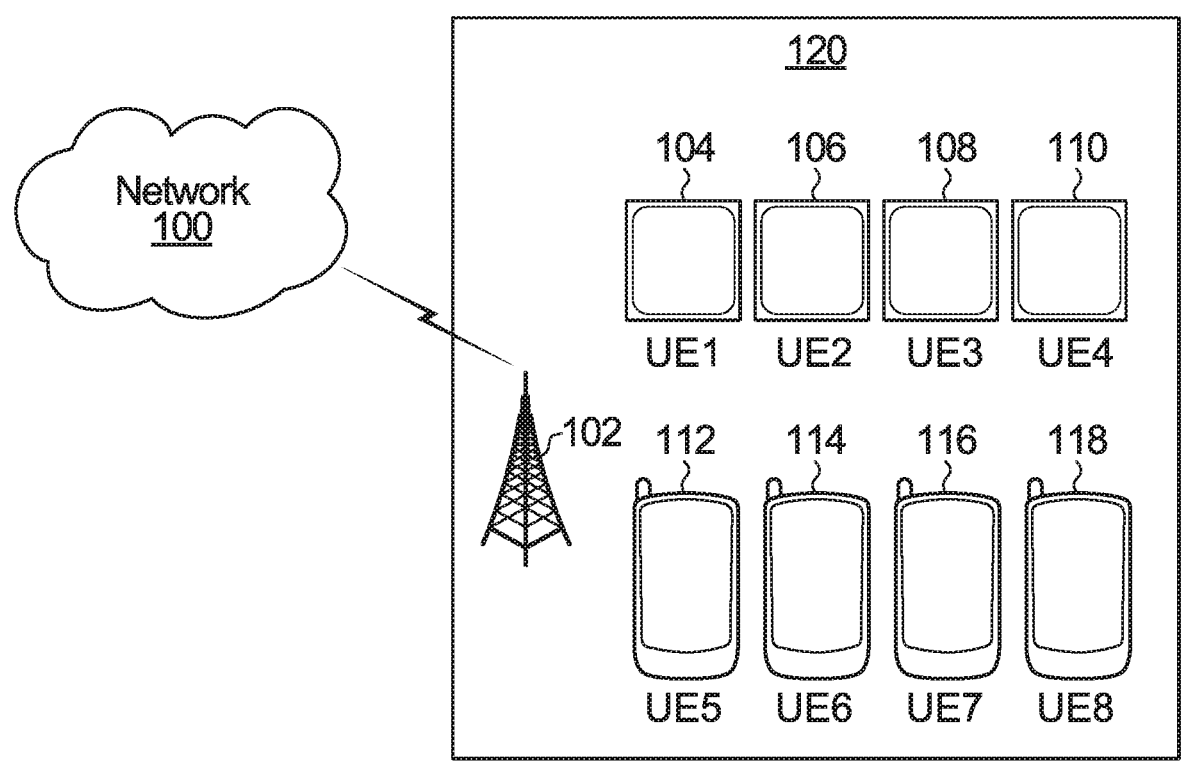
FIG. 1 is a block diagram of a network configured to implement pilot-data overlap for grant-free uplink transmission.

Generally, embodiments of the present disclosure provide a method and system for pilot and data overlap for uplink and downlink transmission. For simplicity and clarity of illustration, reference numerals may be repeated among the figures to indicate corresponding or analogous elements. Numerous details are set forth to provide an understanding of the examples described herein. The examples may be practiced without these details. In other instances, wellknown methods, procedures, and components are not described in detail to avoid obscuring the examples described. The description is not to be considered as limited to the scope of the examples described herein.

As used herein, a "pilot" includes any type of reference signal, sequence or symbol e.g. which may be used for demodulation and/or channel estimation. In some embodiments, the use of an overlap between pilot and data allows a reduction in pilot overhead compared to a system in which there is no such overlap. Examples of this are provided below. In some implementations, the use of an overlap between pilot and data may allow longer pilot sequences, which in turn may allow a larger number of pilot sequences, so as to reduce the chance of pilot collision in uplink transmissions compared to a system with a smaller number of pilots. Examples of this are provided below. Such systems and methods have various applications including, but not limited to:

a. supporting massive machine connections (MMC);
   b. Low-latency applications, such as ultra reliable low latency communication (URLLC), wherein a delay due to a scheduling request and uplink grant could be too long to meet the low-latency requirements;
   c. Uplink short-packet transmission, where the control signaling overhead could be too high.

The use of dedicated, fixed length pilot locations as described in the background may not always be optimal in all scenarios. It would be advantageous to allow different applications to use different pilot lengths and different pilot locations. Some embodiments provide for the coexistence of pilots with different lengths and locations. Even in a grant-based uplink, the use of dedicated pilot locations may not be optimal in terms of pilot overhead.

For the purpose of this description, a grant-free UE is a UE that is configured to transmit grant-free traffic. The UE may also have other capabilities including transmission of grant-based traffic. Grant-free transmission means that a UE does not rely on a dynamic scheduling request and grant mechanism to transmit data. The transmission resources and formats (e.g. coding and modulation schemes) may be pre-configured or semi-statically configured. Similarly, a grant-based UE is a UE that is configured to transmit grant-based traffic, but such a UE may also have other capabilities including transmission of grant-free traffic. A contention-based grant-free transmission is a transmission where it is possible for multiple UEs to be contending for the same resource.

For grant-free traffic, independent of any scheduling request, a UE may be mapped to resources for grant-free transmission. The resources may not be dedicated to a UE, and there can be multiple UEs mapped to the same resource. A given UE that has no data to transmit will not transmit using the mapped resources.

In some embodiments, a pilot and data transmission scheme is provided that allows collisions between transmitted pilots of one UE and transmitted data of the same UE or another UE.

Referring to FIG. 1, a schematic diagram of a network 100 is shown. A radio access network including one or more base station (BS) 102 provides uplink and downlink communication to the backhaul/core network 100 for a plurality of UEs 104-418 within a coverage area 120 of the BS 102. Depending on the type of access network, other types of radio access nodes may be used including, for example, a Node-B (NodeB), an evolved NodeB (eNodeB), a Home NodeB, a Home eNodeB, a site controller, an access point (AP), or a wireless router.

Similarly, UEs 104-118 are also meant to be illustrative of other end user devices which may be configured as disclosed herein for uplink/downlink communication with BS 102. Examples of other user devices include wireless transmit/receive units (WTRUs), mobile stations, wireless devices, fixed or mobile subscriber units, cellular telephones, personal digital assistants (PDAs), smart phones, laptops, computers, touchpads, wireless sensors, and consumer electronics devices. Other possibilities exist for the UEs 104-108.

In a specific example, UEs 104-110 are grant-free UEs that may require low latency, and have sporadic traffic requirements, and UEs 112-118 are grant-based/scheduled UEs that may not have as tight a latency requirement, and may have more consistent traffic requirements, at least when active. In a more specific example, the UEs 104-110 employ orthogonal frequency division multiplexing (OFDM) to transmit URLLC traffic. It is contemplated that OFDM may be used in combination with orthogonal multiple access or a non-orthogonal multiple access scheme such as Sparse Code Multiple Access (SCMA), Interleave-Grid Multiple Access (IGMA), Multi-user shared access (MUSA), Low code rate spreading, Frequency domain spreading, Non-orthogonal coded multiple access (NCMA), Pattern division multiple access (PDMA), Resource spread multiple access (RSMA), Low density spreading with signature vector extension (LDS-SVE), Low code rate and signature based shared access (LSSA), Non-orthogonal coded access (NOCA), Interleave Division Multiple Access (IDMA), Repetition division multiple access (RDMA) and Group Orthogonal Coded Access (GOCA). UEs 112-118 may, for example, transmit enhanced mobile broadband (eMBB) traffic. UEs 112-118 may also use OFDM in combination with orthogonal multiple access or a non-orthogonal multiple access scheme. The BS 102 may, for example, be an access point. The described functions of the BS 102 may also be performed by multiple base stations. FIG. 1 shows one BS 102 and eight UEs 104-118 for illustrative purposes, however there may be more than one BS 102 and the coverage area 120 of the BS 102 may include more or fewer than eight UEs 104-118 in communication with the BS 102. BS 102 is configured to perform scheduling and/or resource allocation with a possible overlap between pilot and data, using one of the methods described herein. UEs 104,106, 108,110 are configured to perform uplink pilot and data transmission using one or more of the methods detailed below.

In accordance with an embodiment of the invention, for uplink transmission, which may, for example, be (contention-based) grant-free uplink transmission or grant-based uplink transmission by a UE, the UE transmits a pilot sequence using a first time-frequency resource that at least partially overlaps with a second time-frequency resource allocated for data transmission. On the network side, a network element such as a base station or other type of radio access node performs scheduling and/or resource allocation that may result in the overlap, and receives an uplink transmission in which a pilot sequence uses a first time-frequency resource that at least partially overlaps with a second time-frequency resource allocated for data transmission.

Figure 2:
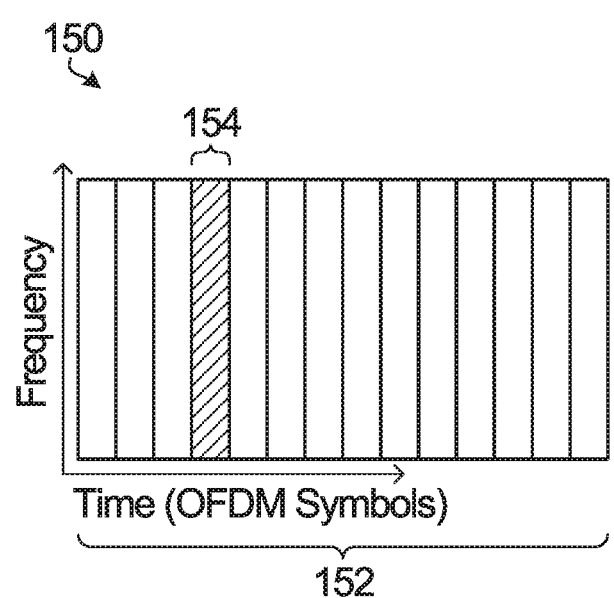
FIG. 2 is a first example of pilot-data overlap of transmissions from a single UE.

In some embodiments, the second time-frequency resource is allocated for data transmission by the same user equipment that transmitted the pilot sequence. An example of this will be described with reference to FIG. 2 which shows time-frequency resources 150 scheduled or allocated to a first UE. For FIG. 2 and other similar figures, the horizontal dimension represents time, in terms of OFDM symbol durations. The vertical dimension represents frequency, in terms of sub-carriers within a bandwidth. Time-frequency resources 150 for the first UE include a region 152 for data transmission (hereinafter simply "for data"), and a region 154 for pilot sequence transmission (hereinafter simply "for pilot"). It can be seen that the region 154 for pilot for the UE overlaps with the region 152 for data by the same UE.

In some embodiments, the second time-frequency resource is scheduled or allocated for data transmission by a different UE. An example of this will be described with reference to FIG. 3A which shows time-frequency resources 200 scheduled or allocated to a first UE, and time-frequency resources 210 scheduled or allocated to a second UE. Time-frequency resources 200 scheduled or allocated to the first UE include regions 202 for data, 204 for pilot sequence transmission, and 206 for data. Time-frequency resources 210 scheduled or allocated to the second UE include regions 212 for data, 214 for pilot, and 216 for data. Time-frequency resources 200,210 are co-located in time-frequency space. For the first UE, its region for pilot 204 overlaps with the region for data 212 of the second UE. Similarly, for the second UE, its region for pilot 214 overlaps with region for data 206 of the first UE.

Figure 3A:
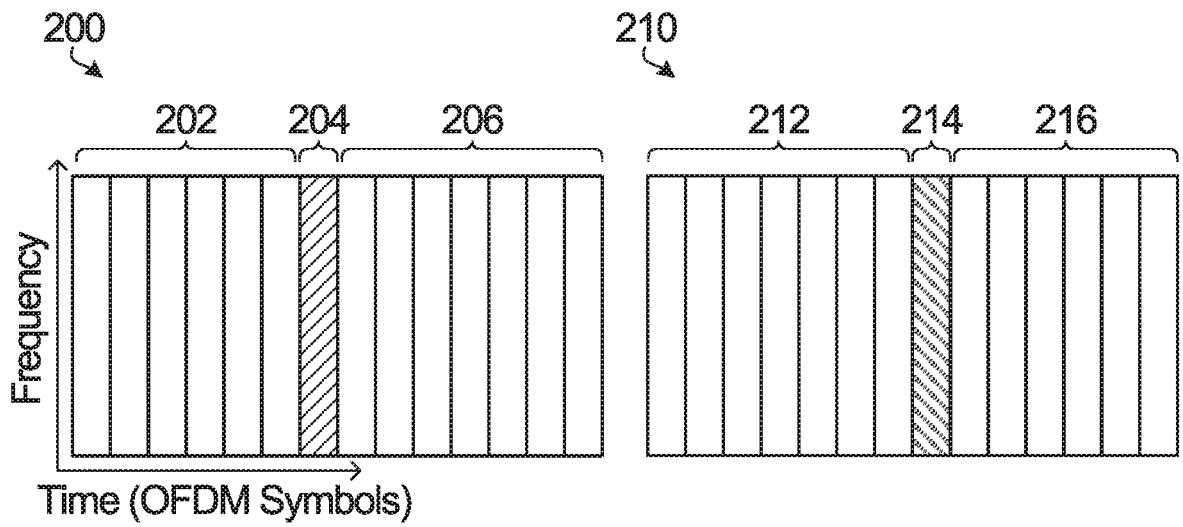
FIGS. 3A and 3B are examples of pilot-data overlap of transmissions from two UEs or between two groups of UEs.

The approach of the example of FIG. 3A has a pilot overhead that is half of that when compared to an approach in which the second UE does NOT transmit at all in the portion of region 212 that overlaps with region for pilot 204, and the first UE does NOT transmit at all in the portion of region 206 that overlaps with region 214.

A second example will be described with reference to FIG. 3B which shows time-frequency resources 300 scheduled or allocated to a first UE, and time-frequency resources 320 scheduled or allocated to a second UE. Time-frequency resources 300 for the first UE include regions 302 for data, 304 for pilot, 306 for data, 308 for pilot and 310 for data. Time-frequency resources 320 for the second UE include regions 322 for data, 324 for pilot, 326 for data, 328 for pilot and 330 for data. It can be seen that for the first UE, its regions for pilot 304,308 overlap with regions for data 326,330 of the second UE. Similarly, for the second UE, its regions for pilot 324,328 overlap with regions for data 302,306 of the first UE for data.

Figure 3B:
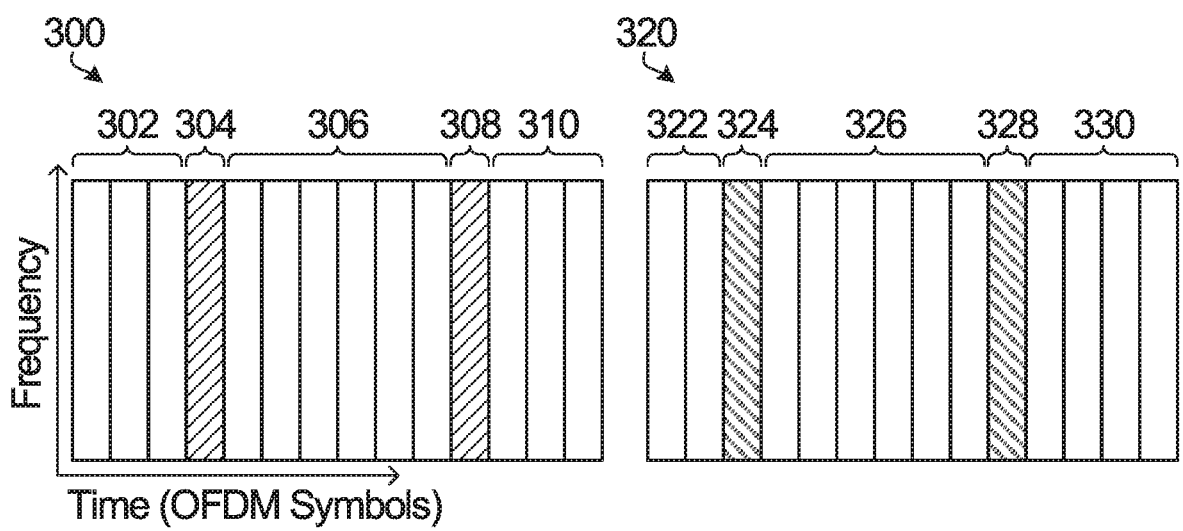

The approach of the example of FIG. 3B allocates twice the amount of resources to pilot compared to the example of FIG. 3A. As a result, for each UE a longer pilot sequence can be used. This has the effect of significantly increasing the pilot pool size, and this can improve pilot collision performance.

In some embodiments, UEs are divided into different groups based one or a combination of criteria. Example criteria include location, service, UE capability, geometry, interference, pilot length. The criteria may reflect a relative ability to perform channel estimation. For example, with a location based criteria, UEs that are closer to a base station may be able to perform channel estimation better than UEs that are farther from the base station. With this group-based approach, each group of UEs is allocated different pilot locations. UEs from different groups use different pilot locations. Referring again to the example of FIG. 3A, the time-frequency resources 200 can be viewed as the time-frequency resources for a first group of UEs, and the time-frequency resources 210 can be viewed as the time-frequency resources for a second group of UEs. Note that while all the UEs can transmit using the time-frequency resources, typically in a grant-free context, a given UE is transmitting infrequently, such that the chance of collision within a group is low.

Similarly, referring again to the example of FIG. 3B, the time-frequency resources 300 can be viewed as the time-frequency resources for a first group of UEs, and the time-frequency resources 320 can be viewed as the time-frequency resources for a second group of UEs.

Figure 4:
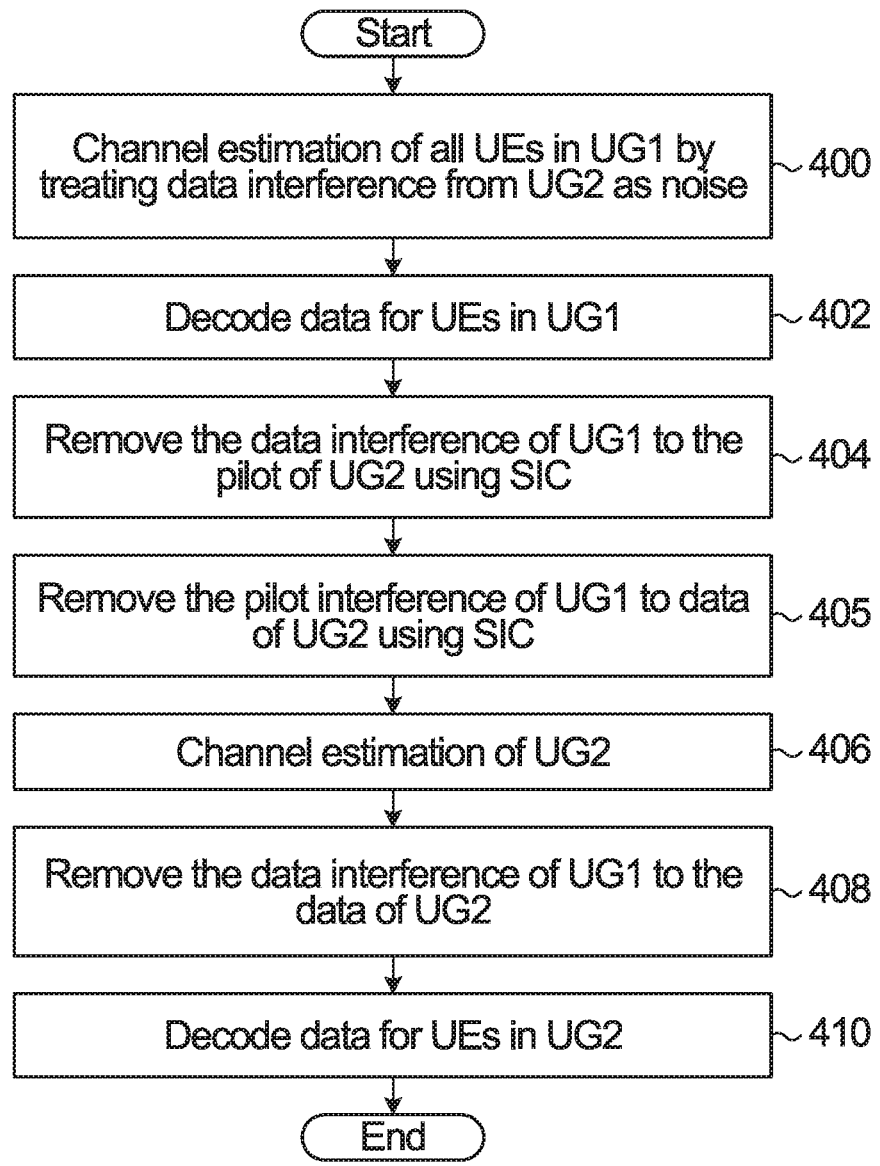
FIG. 4 is a flowchart of a method of detecting transmissions from groups of UEs with overlapping pilot and data.

FIG. 4 is a flowchart of an example detection procedure for receiving signals with overlapping pilot and data. This method might be performed in a base station for example. The flowchart is for the case where UEs are divided into groups as described above. Two groups of UEs are referred to as UE group 1 (UG1) and UE group 2 (UG2) in FIG. 4. However, the same approach is applicable in a context where groups are not used. In this case, the same procedure would be applied, but references to a group of UEs would instead refer to a single UE. For this example, the grouping of the UEs is such the UEs in UG1 are nearer to the base station (near UEs) than the UEs in UG2 (far UEs). A similar approach can be applied when the UEs are divided into more than two groups.

The method begins in block 400 with performing channel estimation for all UEs in UG1. While channel estimation for the UEs in UG1 is performed, data interference from UEs in UG2 is treated as noise. Because the UG1 UEs are near UEs and the UG2 UEs are far UEs, the channel estimation for UG1 will usually be good, since the interference power from UG2 is smaller than UG1's pilot power. Next, in block 402, transmissions from UEs in UG1 are decoded by treating the interference from pilot and data of UEs in UG2 as noise. In block 404, the data interference of UG1 UEs to the pilot of UG2 UEs is removed, for example through successive interference cancellation (SIC). In block 405, the pilot interference of UG1 to data of UG2 is removed through SIC. Then, in block 406, channel estimation for UEs in UG2 is performed. At this point, the channel estimation for UG2 will usually be good, as most of the interference from UG1 data has been removed using SIC. Following this, the data interference of UG1 to the data of UG2 is removed through SIC in block 408, and after that, the UG2 transmissions are decoded in block 410.

In some embodiments, a heterogeneous pilot setup is employed, meaning different UEs have differently structured pilots that coexist. In a specific example, the pilots are structured such that channel estimation for a first UE or group of UEs (UG1) is affected by a second UE or group of UEs (UG2) (but the effect is small after SIC), and channel estimation for the second UE or group of UEs is not affected by the first UE or group of UEs. For the purpose of this embodiment, the following definitions are provided:

First time-frequency resource=resource for pilot for UG1
Second time-frequency resource=resource for data for UG2
Third time-frequency resource=resource for pilot for UG2
Fourth time-frequency resource=resource for data for UG1

For this embodiment,
1) the first time-frequency resource overlaps with the second time-frequency resource. This means that for UEs in UG1, their pilots experience overlap with UG2 data.
2) the third time-frequency resource does not overlap with the first, second or fourth time-frequency resource. This means that the pilot for UEs in UG2 does not experience interference (except possibly from the pilot of other UEs in UG2).

3) Also, there is no overlap between data and pilot of same UE:

the third time-frequency resource does not overlap with the second time-frequency resource; and the fourth time-frequency resource does not overlap with the first time-frequency resource.

An example of this approach will now be described with reference to FIG. 5 which shows time-frequency resources 500 scheduled or allocated to a first group of UEs, and time-frequency resources 520 scheduled or allocated to a second group of UEs. Time-frequency resources 500 for the first group of UEs include regions 502 for data, 504 for pilot, 508 for zero sequence transmission, and 510 for data. Time-frequency resources 520 for the second group of UEs include regions 522 for data, 524 for pilot, and 526 for data. It can be seen that for the first group of UEs, its region for pilot 504 overlaps with region for data 522 of the second group of UEs for data, so there is some interference. However, for second group of UEs, its region for pilot 524 overlaps with the region 508 for zero sequence transmission allocation for the first group of UEs, and zero sequence transmission does not cause interference to the pilots of the second group of UEs using region 524.

Figure 5:
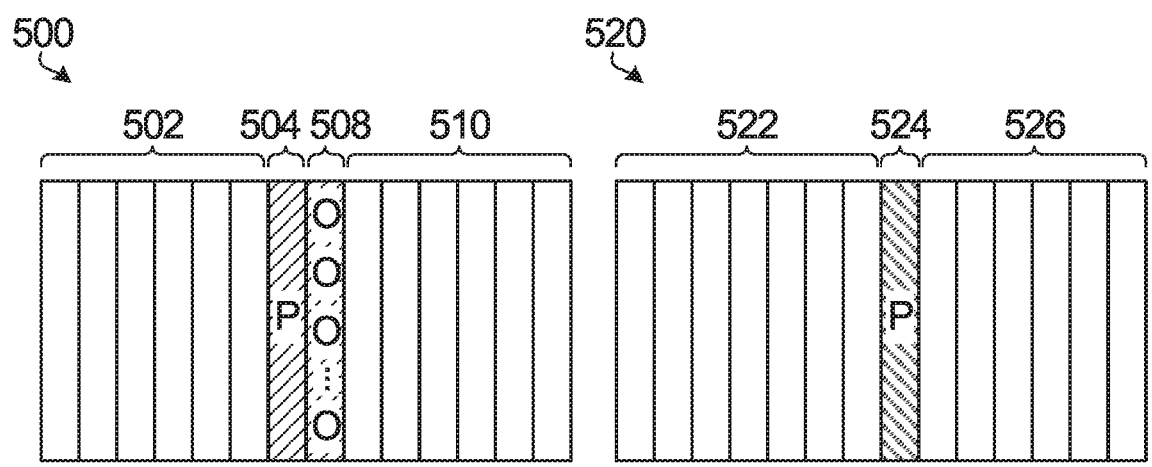
FIG. 5 is an example of pilot-data overlap of transmissions from two UEs or between two groups of UEs in which a heterogeneous pilot design is employed such that the overlap is asymmetrical.
Figure 6:
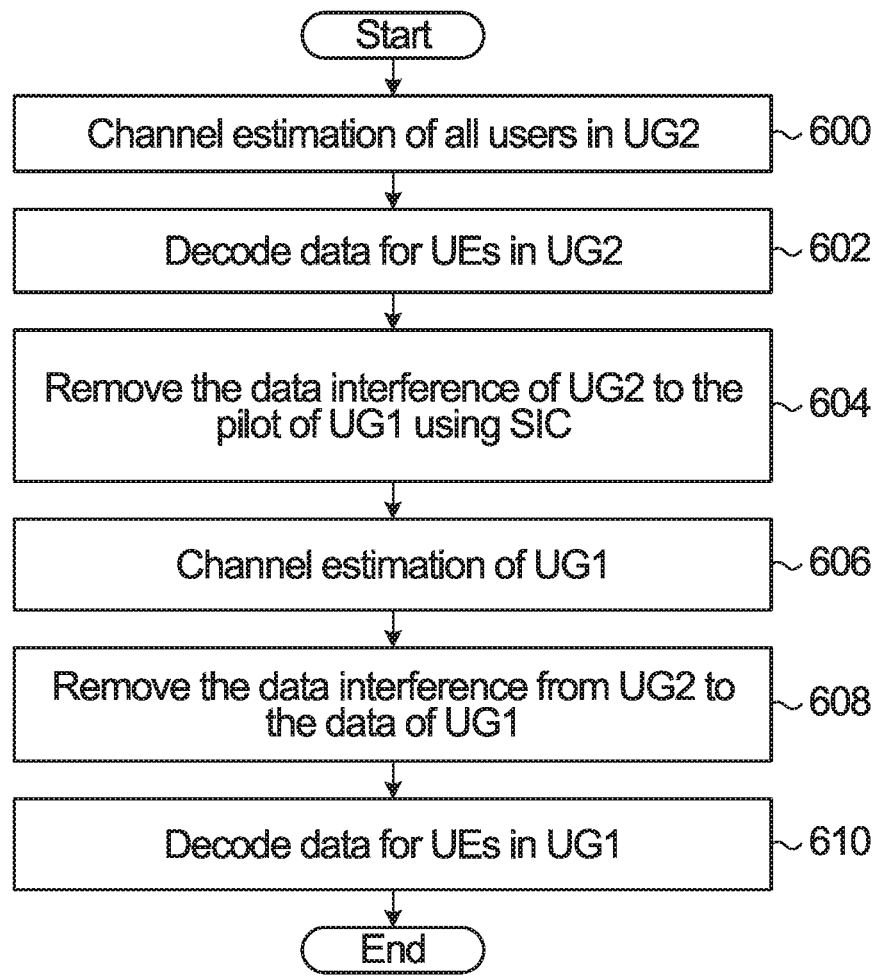
FIG. 6 is a flowchart of a method of detecting transmissions from groups of UEs with overlapping pilot and data with a heterogeneous pilot design.

FIG. 6 is a flowchart of an example detection procedure for heterogeneous pilots, for example for the pilot example of FIG. 5.

The method begins in block 600 with performing channel estimation for all UEs in UG2. The channel estimation for UEs in UG2 should be good since there is no interference power from UG1. Next, in block 602, transmissions from UEs in UG2 are decoded. In block 604, the data interference of UG2 UEs to the pilot of UG1 UEs is removed through successive interference cancellation (SIC). Then, in block 606, channel estimation for UEs in UG1 is performed. At this point, the channel estimation for UG1 will usually be good, as most of the interference from UG2 data has been removed using SIC. Following this in block 608 the data interference from UG2 to the data of UG1 is removed using SIC, and then data for UEs in UG1 is decoded in block 610.

In some embodiments described, the pilot of one UE is subject to interference from data from another UE. In a group based approach, pilots of a first group of UEs are subject to interference from data from a second group of UEs. In some embodiments, the pilots of the second group of UEs are subject to interference from data from the first group of UEs. In embodiments with heterogeneous pilots, the pilots of the second group of UEs are not subject to interference from data from the first group of UEs.

In another embodiment, a common time-frequency resource is used for pilot for a group of UEs. There is also a common time-frequency resource for data for the group of UEs that does not overlap with the time-frequency resource used for pilots. In addition, there is at least one time-frequency resource for data for a proper subset of the group of UEs that overlaps with at least part of the time-frequency resource for pilots. A proper subset of the group of UEs does not include all UEs of the group. There may be multiple such time-frequency resources for respective proper subsets of UEs.

Figure 7A:
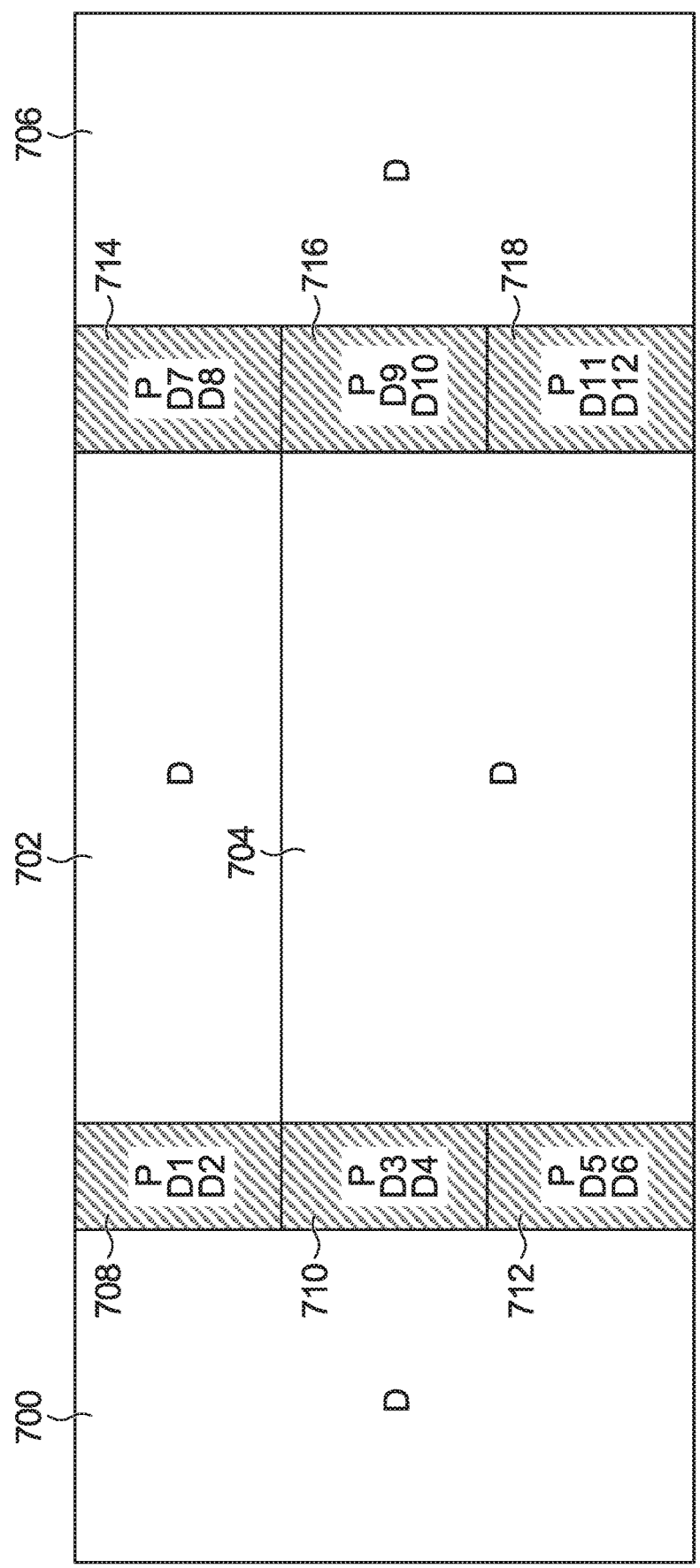
FIGS. 7A and 7B are two further examples of pilot-data overlap of transmissions from multiple UEs in which pilot data for a group of UEs overlaps with data of a proper subset of the group of UEs.

An example of this approach is depicted in FIG. 7A. Shown are regions 700,702,704,706 for data transmission common to all UEs. Shown are regions 708,710,712,714, 716,718 for pilot transmission that are common to all UEs. However, each of the regions for pilot transmission is also available for data transmission by a proper subset of UEs. In FIG. 7A, and the following description, Di means data transmission for UEi. In the illustrated example:

Region 708 is for pilot for all UEs, and data for UE1 and UE2;

Region 710 is for pilot for all UEs, and data for UE3 and UE4;

Region 712 is for pilot for all UEs, and data for UE5 and UE6;

Region 714 is for pilot for all UEs, and data for UE7 and UE8;

Region 716 is for pilot for all UEs, and data for UE9 and UE10;

Region 718 is for pilot for all UEs, and data for UE11 and UE12;

Unlike the example of FIG. 2B, where the entire pilot transmission of each UE in a first group is subject to interference from the data from all UEs in a second group, here, only part of the pilot transmission of UE is subject to interference from the data from a given other UE. Since it is unlikely that many UEs are transmitting simultaneously, most of the time the pilot will not experience much interference from data. Compared to an implementation with dedicated pilot locations (e.g. FIG. 11), if region 700 has 3 OFDM symbols, region 702 has 6 OFDM symbols, and region 706 has 3 OFDM symbols, and each pilot region occupies one OFDM symbol, this approach has reduced overhead, in that the frequency resources for pilot are also available for data.

In a variant of the approach described with reference to FIG. 7A, in each of regions 703,710,714,716,718, pilots for all UEs except those that are transmitting data in the same regions are transmitted. For example, in region 708, pilots are transmitted for UE3, UE4, UE12, but not for UE1 and UE2 since data for UE1 and UE2 are transmitted in that region. In this scenario, there is no overlap between users' own pilot and data signal. This may reduce pilot overhead, but pilot sequence length will be shorter.

Figure 7B:
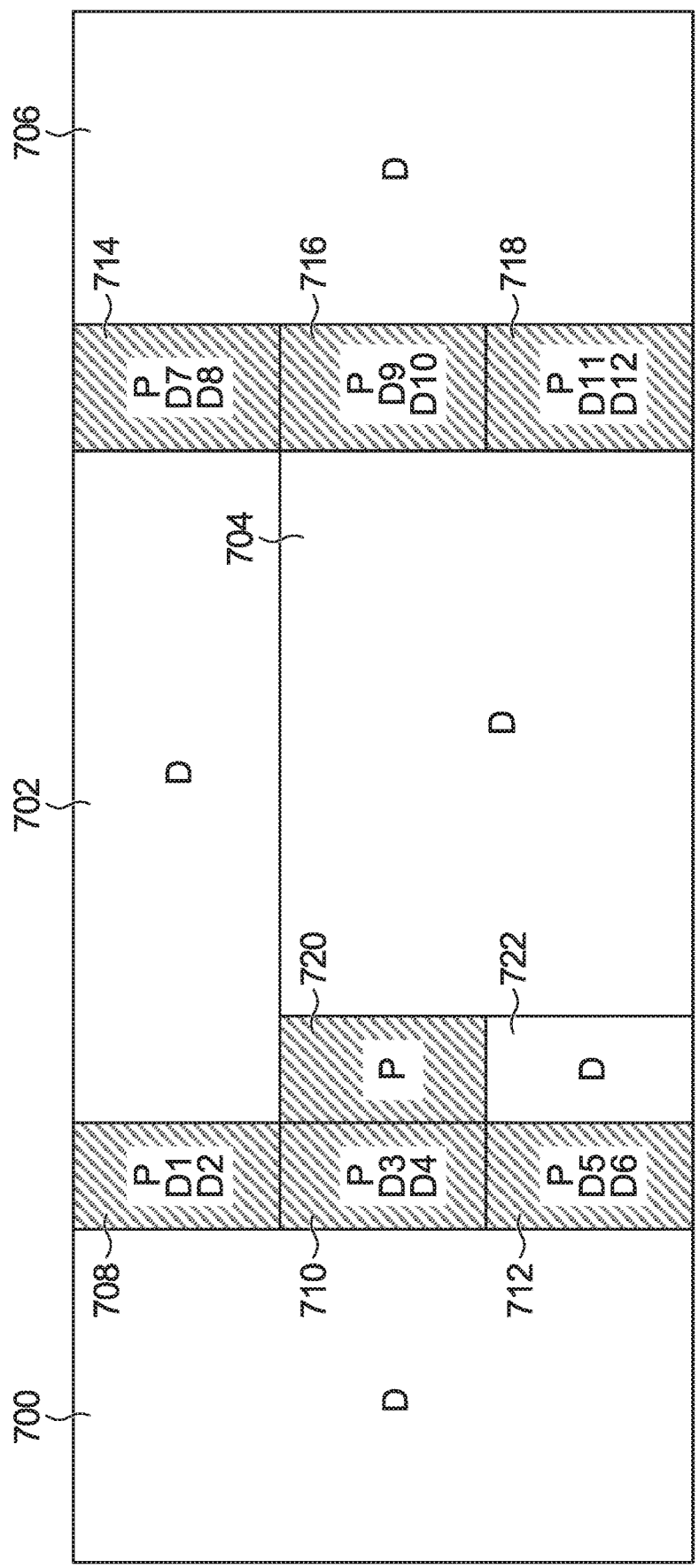
Figure 11:
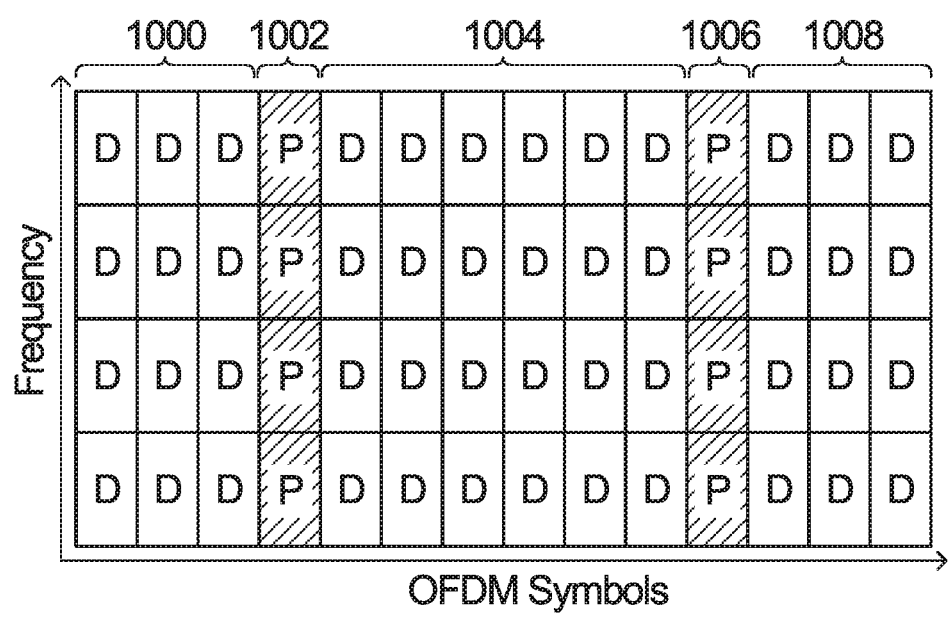
FIG. 11 depicts a conventional pilot design for LTE.

FIG. 7B shows a variant of the FIG. 7A example with the same overhead as the FIG. 11 approach. FIG. 7B is the same as FIG. 7A, except region 704 is slightly smaller, making room for region 720 dedicated for pilot transmission for all UEs, and region 722 (part of region 704 of the example of FIG. 7A), remains available for data for all UEs. With this approach, compared to the FIG. 7A approach, a slightly longer pilot length can be employed, yielding the advantages discussed previously.

Compared to the Example of FIG. 2A, for example, this approach benefits from increased pilot length, which gives better correlation properties among pilots, and an increased pilot pool size, which leads to better pilot collision performance. Channel estimation performance can be improved with pilot power boosting as in previous embodiments.

Figure 8:
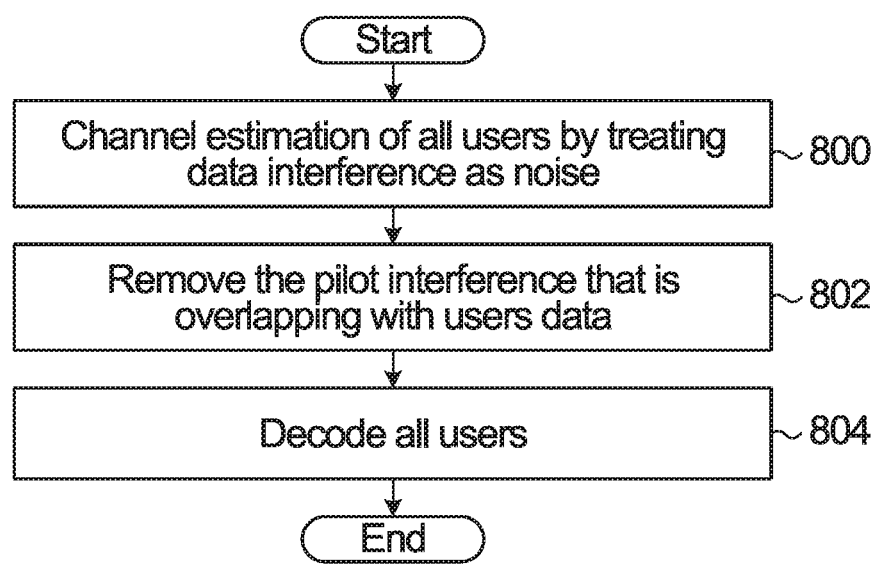
FIGS. 8 and 9 are flowcharts of two methods of detecting transmissions in which pilot data for a group of UEs overlaps with data of a proper subset of the group of UEs.

FIG. 8 is a flowchart of a first example method of receiving transmissions based on the approaches described above, as exemplified in FIGS. 7A and 7B.

The method begins in block 800 with performing channel estimation for all UEs by treating data interference as noise. In block 802, the pilot interference that is overlapping with UE data is removed through SIC. Finally, in block 804, the data of all UEs is decoded.

Figure 9:
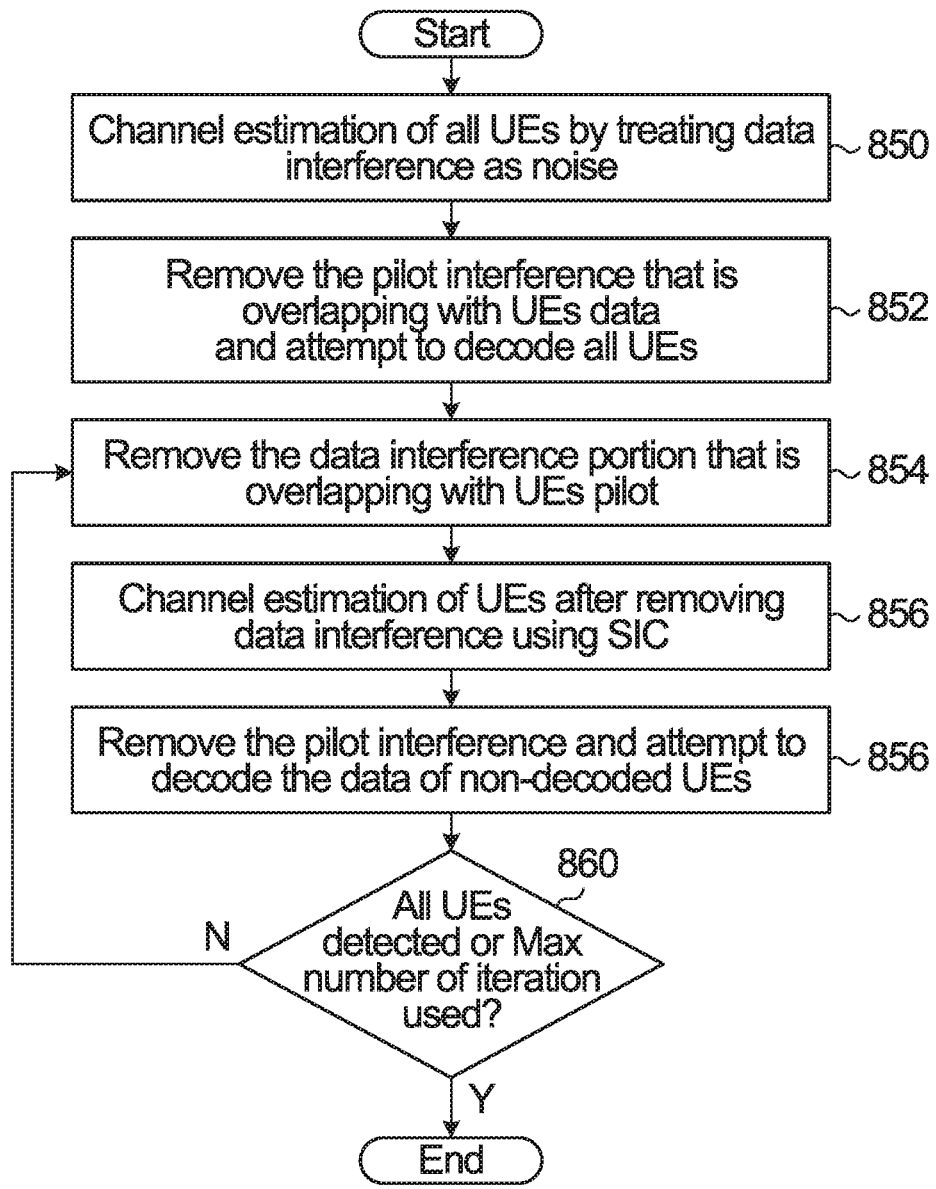

FIG. 9 is a flowchart of a second example method of receiving transmissions based on the approaches described above, as exemplified in FIGS. 7A and 7B.

The method begins in block 850 with performing channel estimation for all UEs by treating data interference as noise. In block 852, the pilot interference that is overlapping with UE data is removed, and an attempt is made to decode all UE data. In block 854, the data interference that is overlapping with the pilot is removed using SIC, based on the result of the decoding in block 852. Following this, channel estimation for UEs is performed again after removing the data interference. Having re-estimated the channels, pilot interference is again removed, and an attempt is made to decode the data of non-decoded UEs, i.e. UEs that were not successfully decoded in block 852. The method continues back at block 854 until all UEs have been decoded, or some maximum number of iterations have been performed (or more generally until some stopping criteria are met), as indicated in block 860.

In another embodiment, the pilot data overlap may be applied to uplink transmission in different cells (more generally transmission to different access points). For example, in cell A, the relative time-frequency location of pilot and data in one slot may be configured to be as 300 of FIG. 3B. While in cell B, which is a neighboring cell of cell A, the relative time-frequency location of pilot and data may be configured as 320 of FIG. 3B. The interference from the data transmission of a UE in cell B over pilot transmission of a UE in cell A is usually small due to geometry difference. The interference can be further reduced when pilot power boosting is applied.

Figure 10A:
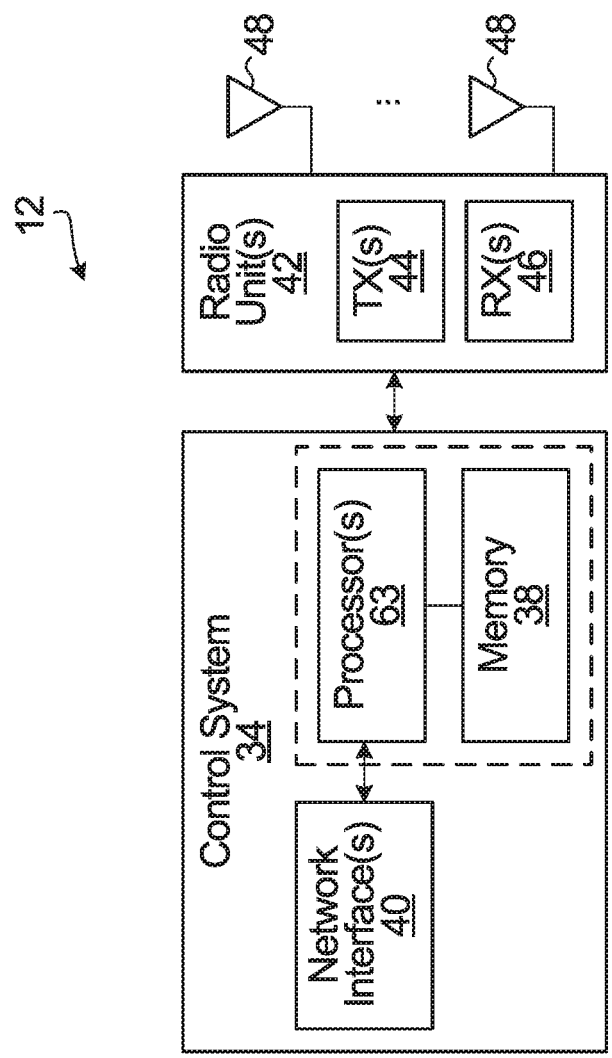
FIG. 10A is a block diagram of a base station.

FIG. 10A is a schematic block diagram of a BS 12 according to some embodiments of the present disclosure. As illustrated, the BS 12 includes a control system 34 configured to perform the access node functions described herein. In some implementations, the control system 34 is in the form of circuitry configured to perform the access node functions. In yet other implementations, the control system or circuitry 34 includes one or more processors 36 (e.g., CPUs, ASICs, FPGAs, and/or the like) and memory 38 and possibly a network interface 40. The BS 12 also includes one or more radio units 42 that each includes one or more transmitters 44 and one or more receivers 46 coupled to one or more antennas 48. In some other implementations, the functionality of the BS 12 described herein may be fully or partially implemented in software or modules that is, e.g., stored in the memory 38 and executed by the processor(s) 36.

In yet other implementations, a computer program including instructions which, when executed by at least one processor, causes the at least one processor to carry out the functionality of the BS 12 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Figure 10B:
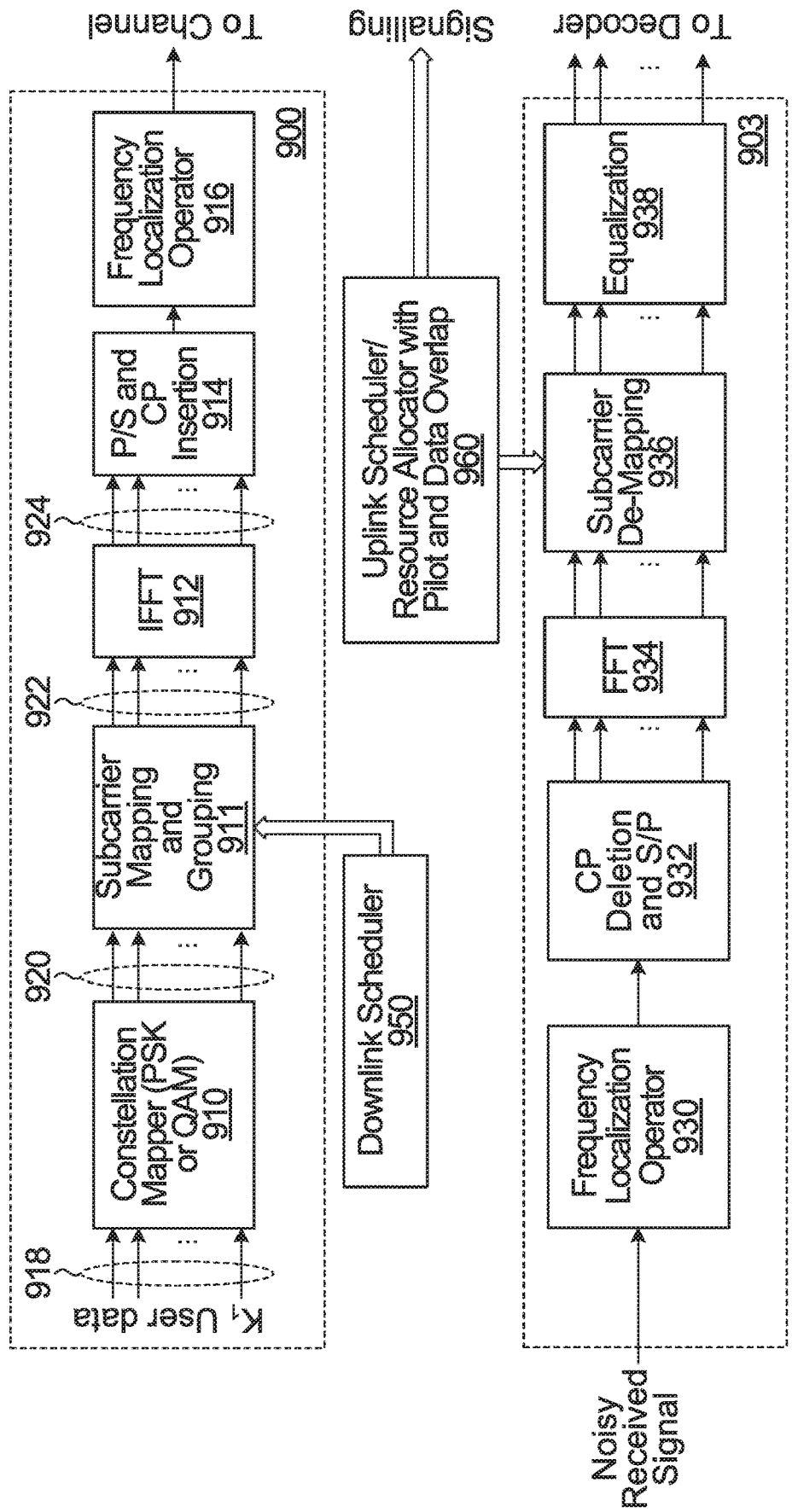
FIG. 10B is a block diagram of a base station transmit chain and receive chain.

FIG. 10B is another example of a base station with a transmit chain generally indicated at 900, and a receive chain of a base station generally indicated at 903.

The transmit chain 900 includes a constellation mapper 910, sub-carrier mapping and grouping block 911, IFFT 912, pilot symbol and cyclic prefix insertion 914, and frequency localization operator 916 (for example filtering, sub-band filtering, windowing, sub-band windowing). Also shown is a downlink scheduler 950 that performs downlink scheduling.

In operation, constellation mapper 910 receives UE data (more generally, UE content containing data and/or signalling) for downlink transmission to $K_1$ UEs, where $K_1 >= 1$. The constellation mapper 910 maps the UE data for each of the $K_1$ UEs to a respective stream of constellation symbols and outputs this at 920. The number of UE bits per symbol depends on the particular constellation employed by the constellation mapper 910. In the example of quadrature amplitude modulation (QAM), 2 bits from for each UE are mapped to a respective QAM symbol.

For each OFDM symbol period, the sub-carrier mapping and grouping block 911 groups and maps the constellation symbols produced by the constellation mapper 910 to up to P inputs of the IFFT 912 at 922. The grouping and mapping is performed based on downlink scheduling information received from the downlink scheduler 950, in accordance with a defined resource block definition and allocation for the content of the $K_1$ UEs being processed in transmit chain 900. As noted above, downlink transmissions are generally scheduled for all UEs. P is the size of the IFFT 912. Not all of the P inputs are necessarily used for each OFDM symbol period. The IFFT 912 receives up to P symbols, and outputs P time domain samples at 924. Following this, in some implementations, time domain pilot symbols are inserted and a cyclic prefix is added in block 914. The frequency localization operator 916 may, for example, apply a filter which limits the spectrum at the output of the transmit chain 900.

Also shown is an uplink scheduler or resource allocator 960 that performs scheduling for grant-based uplink transmissions and/or resource allocation for grant-free uplink transmissions with an overlap between data and pilot, as per one of the described embodiments or examples. Scheduling typically allocates a specific resource to a specific UE for transmission while resource allocation may involve mapping multiple UEs to a resource for grant-free transmission, which the UE then uses only if it has data to send. Resource allocation typically occurs once, although it can be updated from time to time, or regularly. This can, for example, involve identifying a semi-persistent resource for the UE to use when it has data to send. As used herein, resource allocation is intended to include any type of allocation whether scheduled or not.

The uplink scheduler/resource allocator 960 transmits signalling information as required, either during an initial connection setup, or on an ongoing basis to inform the UE of the resource to use for grant-based or grant-free transmission. As discussed in more detail below the signalling can indicate time-frequency locations for data and pilots, or can indicate a time-frequency resource pattern generally, with there being a fixed location for data and/or for pilot, or can indicate one of predefined set of fixed patterns of for data and/or for pilot locations.

The receive chain 903 includes frequency localization operator 930, cyclic prefix deletion and pilot symbol processing 932, fast Fourier transform (FFT) 934, sub-carrier de-mapping 936 and equalizer 938. Each element in the receive chain performs corresponding reverse operations to those performed in the transmit chain. The receive chain 903 receives uplink signals generated in accordance with the scheduling information and/or resource allocation information generated by the scheduler and/or resource allocator 960. The sub-carrier de-mapper 936 makes also makes use of the scheduler information and/or resource allocation information from the scheduler and/or resource allocator 960.

The transmitter and receiver of a UE may be similar to those of a base station although there would be no scheduler in the UE. Rather, the UE will receive the scheduling information and/or the resource allocation information, and will generate uplink grant-based and/or grant-free transmissions in accordance with such information. The UE's transmissions will include pilot sequences that may overlap with data, as described in detail above.

Figure 10C:
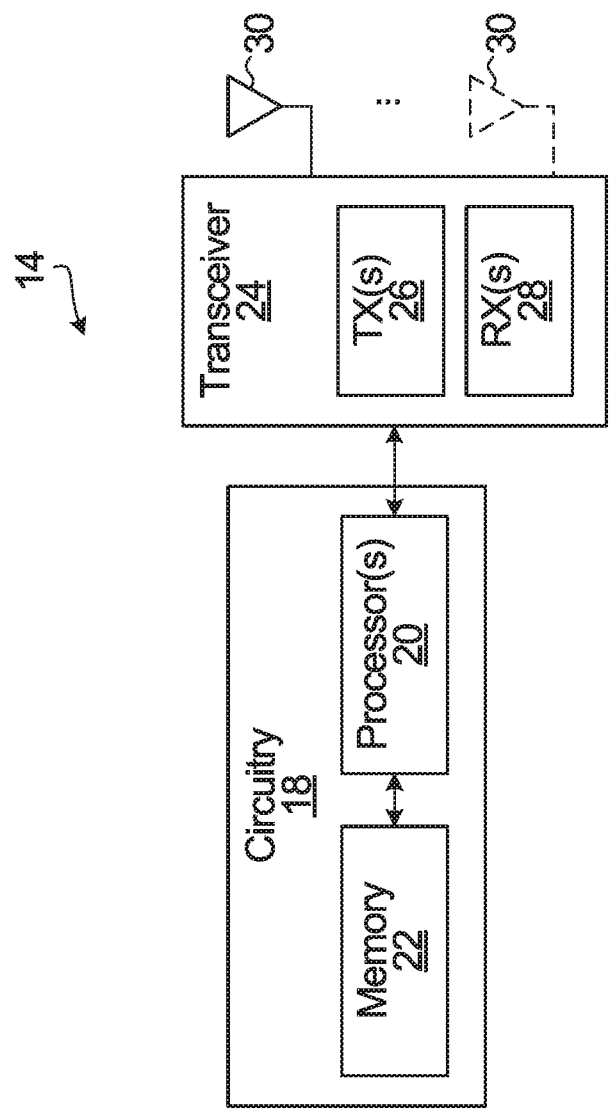
FIG. 10C is a block diagram of a wireless device.

FIG. 10C is a schematic block diagram of the wireless device 14 according to some embodiments of the present disclosure. As illustrated, the wireless device 14 includes circuitry 18 configured to perform the wireless device functions described herein. In some implementations, the circuitry 18 includes one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some other implementations, the functionality of the wireless device 14 described herein may be fully or partially implemented in software or modules that is, e.g., stored in the memory 22 and executed by the processor(s) 20.

In yet other implementations, a computer program including instructions which, when executed by at least one processor, causes the at least one processor to carry out the functionality of the wireless device 14 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Signalling

For any of the embodiments described herein, the network may transmit signaling indicating a time-frequency resource for a given UE to use for transmission, the time-frequency resource comprising the first time-frequency resource for pilot sequence transmission and/or a further time-frequency resource for data transmission. This signalling may explicitly or implicitly indicate the actual time-frequency resources to be employed. In some embodiments, the signaling indicates locations for data and/or for pilot, or can indicate a time-frequency resource pattern generally within which data and/or pilot locations are indicated, or the signaling can indicate a selected pattern from a set of predefined patterns of locations of time-frequency resources for pilot and/or data. Other possibilities exist for the signaling.

It is understood that the time-frequency pilot and data locations indicated by the signaling can either be relative or absolute locations. A (pilot or data) location can be relative to a particular reference such as a predetermined time-frequency element or pattern (e.g. a sub-frame, a frame, a transmission time interval (TTI) or a transmission time unit (TTU), a unit time-frequency resource grid). Alternatively, a (pilot of data) location can be expressed as an absolute or fixed location, for example within a time-frequency pattern.

For the group-based approaches, in other embodiments, (relative or absolute) locations of the time-frequency resource allocations for pilot and/or for data are assigned (either in advance, or on an ongoing basis), such that once a UE is assigned to a group, the UE can use its group assignment to determine the (relative or absolute) locations of its time-frequency allocations. The group assignment may be performed in advance, or signalled to the UE over the air. Group assignment over the air is a specific example of signalling indicating the locations for data and/or pilot for a given UE since the UE can ascertain the time-frequency resources from the group assignment in this case, including the resource to use for data and the resource to use for pilot.

In some embodiments, there is a set of predefined patterns for relative locations of the pilot and data with respect to an absolute time-frequency resource. The absolute time-frequency resource may, for example, be specified by scheduling, or may be pre-specified for grant-free transmissions. For example, the two patterns of FIG. 3A might correspond to two predefined patterns. A base station can then inform the UE of which predefined pattern to use through signalling, within an otherwise specified or determined absolute time-frequency resource. The specific pattern to use by a given UE may be associated with its group in group-based embodiments, or can be specifically instructed to the UE.

In some embodiments, the pilot locations are not signalled as they are predefined and known to both the base station and the UE.

In still further embodiments, the UEs can randomly select their resource pattern for data and pilot among a predefined set of patterns of pilot and data without any signalling or group assignment from the network.

For any of the embodiments described herein, channel estimation performance may be improved with pilot power boosting. With pilot power boosting, for a given UE, the pilot is transmitted with a power that is higher than that of the data.

The embodiments described above have provided various methods and systems that allow for overlap in data and pilot in uplink transmission. In further embodiments, these approaches are also, or alternatively, applied for downlink transmissions, where there is an overlap in downlink data from one TRP (more generally access point) to downlink pilot of another TRP (more generally access point). Methods of transmission by access points, reception by UEs, and corresponding access point and UE apparatuses are also provided.

In some embodiments, this may occur due to a lack of coordination between TRPs with overlapping coverage areas.

In some embodiments, this is done intentionally, and collision information signaling can be sent to UEs indicating the existence of the overlap, so that UEs can perform interference cancellation. The collision information may include the relative time-frequency location of the pilots with respect to data transmission.

In another example of where this might be useful, there may be legacy TRPs that transmit pilots that overlap with data of TRPs with a more current design, where the legacy TRP is not configurable to turn off its pilot in the area of overlap.

According to a broad aspect, the invention provides a method comprising for downlink transmission to a user equipment, a first access point transmitting a pilot sequence using a first time-frequency resource that at least partially overlaps with a second time-frequency resource allocated or scheduled for data transmission by a second access point.

Optionally, the first access point or the second access point transmits signalling indicating the overlap or the pilot location pattern, such that a user equipment receiving the signals can perform interference cancellation.

Optionally, the first access point transmits signaling indicating a time-frequency resource to use for downlink transmission, the time-frequency resource comprising the first time-frequency resource for pilot sequence transmission and a further time-frequency resource for data transmission.

Optionally, the signaling indicates a selected pattern from a set of predefined patterns of time-frequency resources for pilot sequence transmission and for data transmission.

Optionally, the first access point transmits an all zero-sequence in a third time-frequency resource that overlaps with a time-frequency resource allocated or scheduled for pilot sequence transmission of another access point. In this case, optionally, the access point transmits signaling indicating a time-frequency resource used for downlink transmission, the time-frequency resource comprising the first time-frequency resource for pilot sequence transmission and a further time-frequency resource for data transmission that excludes the third time-frequency resource.

In another broad aspect, a method is provided in which a UE receives a first downlink transmission from a first access point comprising a pilot sequence using a first time-frequency resource that at least partially overlaps with a second time-frequency resource allocated or scheduled or allocated for data transmission by a second access point.

Optionally, the method further involves receiving signaling indicating a time-frequency resource pattern to use for downlink transmission, the time-frequency resource pattern indicating the relative location of the first time-frequency resource for pilot sequence transmission and a further time-frequency resource for data transmission.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
for an uplink grant-free transmission by a user equipment, the user equipment transmitting a demodulation reference signal (DMRS) using a first time-frequency resource that at least partially overlaps with a second time-frequency resource allocated for data transmission within a same cell as the DMRS transmission, wherein the transmitted DMRS is subject to interference from uplink grant-free data transmission by another user equipment using the second time-frequency resource within the same cell as the DMRS transmission.

2. The method of claim 1 further comprising:
the user equipment receiving signaling indicating locations of the first time-frequency resource for DMRS transmission and a further time-frequency resource for data transmission by the user equipment.

3. The method of claim 2 wherein the signaling indicates a selected pattern from a set of predefined patterns of locations of time-frequency resources within a subframe for DMRS transmission and for data transmission.

4. The method of claim 1 wherein the second time-frequency resource is allocated for data transmission of a different user equipment.

5. The method of claim 4 further comprising:
the user equipment transmitting data using a third time-frequency resource with a power that is less than that used to transmit the DMRS using the first time-frequency resource.

6. The method of claim 1 wherein:
the first time-frequency resource is available for use by a group of user equipments (UEs) for DMRS transmission.

7. The method of claim 6 wherein the user equipment is included in a group of UEs having a group identifier, the method further comprising:
determining from the group identifier locations of the first time-frequency resource for DMRS transmission and a further time-frequency resource for data transmission by the user equipment.

8. The method of claim 6 wherein the UE is included in the group of UEs based on one or a combination of location, service, UE capability, geometry, interference and pilot length.

9. The method of claim 1 further comprising:
transmitting an all zero-sequence in a third time-frequency resource that overlaps with a time-frequency resource allocated for DMRS transmission of another user equipment.

10. The method of claim 1 further comprising:
the user equipment selecting a pilot and data location pattern from among a set of predefined pilot and data location patterns, each pattern defining locations of time-frequency resources within a subframe for DMRS transmission and for data transmission.

11. A method comprising:
a network element receiving from a user equipment a first uplink grant-free transmission comprising a demodulation reference signal (DMRS) for data demodulation using a first time-frequency resource that at least partially overlaps with a second time-frequency resource allocated for data transmission within a same cell as the first uplink transmission, wherein the transmitted DMRS is subject to interference from uplink grant-free data transmission by another user equipment using the second time-frequency resource within the same cell as the first uplink transmission.

12. The method of claim 11 further comprising:
transmitting signaling indicating locations of the first time-frequency resource for DMRS transmission and a further time-frequency resource for data transmission.

13. The method of claim 11 further comprising transmitting signaling indicating the second time-frequency resource for data transmission by a different user equipment.

14. The method of claim 11 wherein the first time-frequency resource is available for use by a group of user equipments (UEs) for DMRS transmission.

15. The method of claim 14 further comprising:
transmitting signaling that indicates a group identifier for each UE of the group of UEs, the group identifier being associated with a time-frequency resource pattern to use for DMRS transmission and data transmission.

16. The method of claim 14 further comprising grouping UEs into groups based on one or a combination of location, service, UE capability, geometry, interference and pilot length, wherein each group of UEs has a common group identifier.

17. The method of claim 11 wherein:
the network element receiving the first uplink transmission comprises receiving the DMRS using the first time-frequency resource and receiving data using a fourth time-frequency resource;
the method further comprising:
in the same cell as was used for the first uplink transmission, the network element receiving a second uplink transmission comprising receiving data using the second time-frequency resource and receiving DMRS using a third time-frequency resource;
wherein the third time-frequency resource does not overlap with any of the first, second and fourth time-frequency resources such that the DMRS in the second uplink transmission is free from interference from pilot or data of the first uplink transmission;
the fourth time-frequency resource does not overlap with the first time-frequency resource.

18. The method of claim 17 further comprising:
transmitting signaling that indicates locations of the first and fourth time-frequency resources, and indicates locations of the second and third time-frequency resources.

19. The method of claim 17 wherein the first and fourth time-frequency resources are available for use by a group of UEs for DMRS transmission and data transmission respectively, and the second and third time-frequency resources are available for use by a different group of UEs for DMRS transmission and data transmission respectively.

20. The method of claim 19 further comprising:
transmitting signaling indicating a group identifier for each UE, the group identifier being associated with time-frequency resource pattern for DMRS transmission and for data transmission.

21. A user equipment comprising:
a receive chain for receiving:
a resource allocation for grant-free transmission;
a transmit chain configured to transmit, for an uplink grant-free transmission, based on the resource allocation, a DMRS using a first time-frequency resource that at least partially overlaps with a second time-frequency resource allocated for data transmission within a same cell as the DMRS transmission, wherein the transmitted DMRS is subject to interference from uplink grant-free data transmission by another user equipment using the second time-frequency resource within the same cell as the DMRS transmission.

22. The user equipment of claim 21 wherein:
the resource allocation indicates locations of the first time-frequency resource for DMRS transmission and a further time-frequency resource for data transmission by the user equipment.

23. The UE of claim 21 wherein the transmit chain is configured to transmit an all zero-sequence in a third time-frequency resource that overlaps with a time-frequency resource allocated or scheduled for DMRS transmission by another user equipment.

24. A network element comprising a receive chain and a transmit chain, the receive chain configured to receive from a user equipment a first uplink grant-free transmission comprising a DMRS using a first time-frequency resource that at least partially overlaps with a second time-frequency resource allocated for data transmission within a same call as the first uplink transmission, wherein the transmitted DMRS is subject to interference from uplink grant-free data transmission by another user equipment using the second time-frequency resource within the same cell as the first uplink transmission.

25. The network element of claim 24 further comprising:
an uplink scheduler/resource allocator configured to transmit signaling indicating locations of the first time-frequency resource for DMRS transmission and a further time-frequency resource for data transmission by the user equipment.

26. The network element of claim 25, wherein the uplink scheduler/resource allocator is further configured to transmit signaling allocating the second time-frequency resource for data transmission by a different user equipment.

* * * * *